United States Patent
Giralt

(10) Patent No.: US 11,768,653 B2
(45) Date of Patent: Sep. 26, 2023

(54) DYNAMIC WINDOW DETECTION FOR APPLICATION SHARING FROM A VIDEO STREAM

(71) Applicant: Cisco Technology, Inc., San Jose, CA (US)

(72) Inventor: Paul Brian Giralt, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/590,526

(22) Filed: Feb. 1, 2022

(65) Prior Publication Data

US 2023/0244435 A1  Aug. 3, 2023

(51) Int. Cl.
G06F 3/14 (2006.01)
G06F 3/0481 (2022.01)
G06F 3/04842 (2022.01)

(52) U.S. Cl.
CPC .......... *G06F 3/1454* (2013.01); *G06F 3/0481* (2013.01); *G06F 3/04842* (2013.01)

(58) Field of Classification Search
CPC ... G06F 3/1454; G06F 3/0481; G06F 3/04842
See application file for complete search history.

(56) References Cited

U.S. PATENT DOCUMENTS

2006/0092269 A1*  5/2006 Baird ................ H04N 21/4622
                                                      348/E7.083
2006/0164507 A1*  7/2006 Eshkoli ............... H04N 7/152
                                                      348/14.09
2013/0141517 A1   6/2013 Shen et al.
2015/0256567 A1   9/2015 Lian et al.
2016/0234276 A1*  8/2016 Ouyang ................ H04N 7/147
2017/0293458 A1   10/2017 Poel et al.
2019/0166330 A1*  5/2019 Ma ....................... H04L 65/403

FOREIGN PATENT DOCUMENTS

WO    2021148682 A1   7/2021

OTHER PUBLICATIONS

"EnumWindows function (winuser.h)," Microsoft Docs, Win32 Apps, Oct. 13, 2021, 4 pages.

* cited by examiner

*Primary Examiner* — Cao H Nguyen
(74) *Attorney, Agent, or Firm* — Edell, Shapiro & Finnan, LLC

(57) ABSTRACT

Presented herein are techniques in which a conference endpoint receives a request to share content generated by a user device with one or more participant devices. The user device is connected to the conference endpoint and the conference endpoint is participating in a communication session with the one or more participant devices. The conference endpoint detects one or more windows displayed on a display of the conference endpoint; receives a selection of a first window; and shares contents of the first window with the one or more participant devices. The conference endpoint detects that a second window is overlapping the first window such that a first portion of the first window is covered by a second portion of the second window; and performs one or more actions with respect to the second portion of the second window.

20 Claims, 12 Drawing Sheets

```
                                                1000
┌──────────────────────────────────────────────────────────────────────┐
│ USER ON USER DEVICE CONNECTED TO A VIDEOCONFERENCE ENDPOINT INDICATES│  1002
│ DESIRE TO SHARE AN APPLICATION WINDOW TO A HELPER APPLICATION        │
└──────────────────────────────────────────────────────────────────────┘
                                    ↓
┌──────────────────────────────────────────────────────────────────────┐
│ HELPER APPLICATION REQUESTS LIST OF WINDOWS AND COORDINATES FOR THE  │  1004
│ BOUNDS OF THE WINDOW DISPLAY FROM THE OS WINDOW MANAGER              │
└──────────────────────────────────────────────────────────────────────┘
                                    ↓
┌──────────────────────────────────────────────────────────────────────┐
│ HELPER APPLICATION ASKS USER TO SELECT THE WINDOW TO SHARE           │  1006
└──────────────────────────────────────────────────────────────────────┘
                                    ↓
┌──────────────────────────────────────────────────────────────────────┐
│ HELPER APPLICATION MONITORS WINDOW LOCATION AND SIZE THROUGH         │  1008
│ COMMUNICATION WITH OS WINDOW MANAGER                                 │
└──────────────────────────────────────────────────────────────────────┘
                                    ↓
┌──────────────────────────────────────────────────────────────────────┐
│ HELPER APPLICATION COMMUNICATES WITH THE VIDEOCONFERENCE ENDPOINT TO │
│ INDICATE A START SHARING SESSION ALONG WITH THE COORDINATES OF THE   │  1010
│ WINDOW TO BE SHARED                                                  │
└──────────────────────────────────────────────────────────────────────┘
                                    ↓
┌──────────────────────────────────────────────────────────────────────┐
│ VIDEOCONFERENCE ENDPOINT STARTS A SHARE TO THE VIDEO CONFERENCING    │  1012
│ SYSTEM AND STREAMS ONLY THE AREA REPORTED BY THE HELPER APPLICATION  │
└──────────────────────────────────────────────────────────────────────┘
                                    ↓
┌──────────────────────────────────────────────────────────────────────┐
│ HELPER APPLICATION MONITORS WINDOW LOCATION AND SIZE THROUGH         │  1014
│ COMMUNICATION WITH OS WINDOW MANAGER                                 │
└──────────────────────────────────────────────────────────────────────┘
                                    ↓
┌──────────────────────────────────────────────────────────────────────┐
│ HELPER APPLICATION REPORTS ANY CHANGES TO THE WINDOW LOCATION / SIZE │  1016
│ TO THE VIDEO SYSTEM                                                  │
└──────────────────────────────────────────────────────────────────────┘
                                    ↓
┌──────────────────────────────────────────────────────────────────────┐
│ VIDEOCONFERENCE ENDPOINT STREAMS ONLY THE AREA REPORTED BY THE HELPER│
│ APPLICATION TO THE VIDEO CONFERENCING SYSTEM AND ADJUSTS BASED ON    │  1018
│ HELPER APPLICATION INPUT                                             │
└──────────────────────────────────────────────────────────────────────┘
```

```
┌─────────────────────────────────────────────────────────────────┐
│ RECEIVING A REQUEST TO SHARE CONTENT DISPLAYED ON A DISPLAY OF  │──1102
│ A FIRST USER DEVICE WITH ONE OR MORE SECOND PARTICIPANT DEVICES,│
│ WHEREIN THE FIRST USER DEVICE IS PARTICIPATING IN A             │
│ COMMUNICATION SESSION WITH THE ONE OR MORE SECOND PARTICIPANT   │
│ DEVICES VIA A CONFERENCE ENDPOINT                               │
└─────────────────────────────────────────────────────────────────┘
                                  │
                                  ▼
┌─────────────────────────────────────────────────────────────────┐
│ DETECTING ONE OR MORE WINDOWS DISPLAYED ON THE DISPLAY OF       │──1104
│ THE FIRST USER DEVICE                                           │
└─────────────────────────────────────────────────────────────────┘
                                  │
                                  ▼
┌─────────────────────────────────────────────────────────────────┐
│ RECEIVING A SELECTION OF A FIRST WINDOW OF THE ONE OR           │──1106
│ MORE WINDOWS TO SHARE                                           │
└─────────────────────────────────────────────────────────────────┘
                                  │
                                  ▼
┌─────────────────────────────────────────────────────────────────┐
│ SHARING CONTENTS OF THE FIRST WINDOW WITH THE ONE OR MORE SECOND│──1108
│ PARTICIPANT DEVICES                                             │
└─────────────────────────────────────────────────────────────────┘
                                  │
                                  ▼
┌─────────────────────────────────────────────────────────────────┐
│ DETECTING THAT A SECOND WINDOW IS OVERLAPPING THE FIRST WINDOW  │──1110
│ ON THE DISPLAY OF THE FIRST USER DEVICE SUCH THAT A PORTION OF  │
│ THE FIRST WINDOW IS COVERED BY A SECOND PORTION OF THE SECOND   │
│ WINDOW                                                          │
└─────────────────────────────────────────────────────────────────┘
                                  │
                                  ▼
┌─────────────────────────────────────────────────────────────────┐
│ PERFORMING ONE OR MORE ACTIONS WITH RESPECT TO THE SECOND       │──1112
│ PORTION OF THE SECOND WINDOW THAT IS COVERING THE FIRST PORTION │
│ OF THE FIRST WINDOW                                             │
└─────────────────────────────────────────────────────────────────┘
```

FIG.11

DYNAMIC WINDOW DETECTION FOR APPLICATION SHARING FROM A VIDEO STREAM

TECHNICAL FIELD

The present disclosure relates to online meeting content sharing.

BACKGROUND

Users who participate in online meetings can share content in multiple ways. A user may share content using a meeting client or other application running on an operating system of a user device. A user may also connect a user device to a videoconference endpoint and share content from the user device via the videoconference endpoint.

BRIEF DESCRIPTION OF THE DRAWINGS

FIG. 10 is a flowchart illustrating a method for receiving coordinates of a window selected by a user from a helper application installed on a user device, according to an example embodiment.

FIG. 11 is a flowchart illustrating a method for sharing content from a user device via a videoconference endpoint, according to an example embodiment.

DESCRIPTION OF EXAMPLE EMBODIMENTS

Overview

Figure 1:
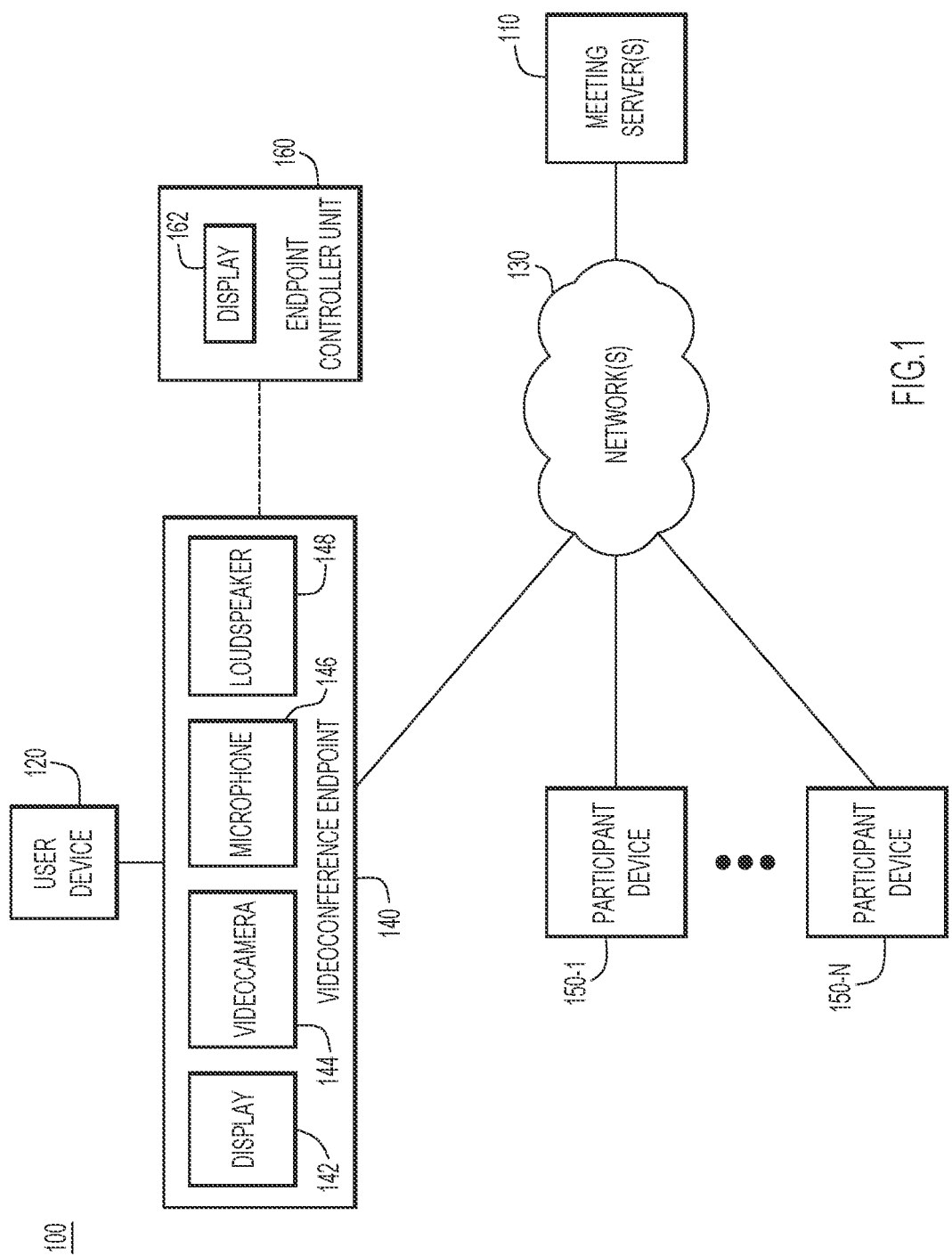
FIG. 1 is a block diagram of a system configured to share content from a user device via a videoconference endpoint, according to an example embodiment.

Presented herein are systems and methods for sharing content in an application window generated by a user device with other devices via a conference endpoint. The methods involve receiving, at a conference endpoint, a request to share content generated by a user device with one or more participant devices. The user device is connected to the conference endpoint and the conference endpoint is participating in a communication session with the one or more participant devices. The methods further involve detecting one or more windows generated by the user device and displayed on a display of the conference endpoint, receiving a selection of a first window of the one or more windows to share, and sharing contents of the first window with the one or more participant devices. The methods further involve detecting that a second window is overlapping the first window on the display of the conference endpoint such that a first portion of the first window is covered by a second portion of the second window, and performing one or more actions with respect to the second portion of the second window that is covering the first portion of the first window.

EXAMPLE EMBODIMENTS

In an online meeting space environment, participants and/or users (these terms are used interchangeably throughout this description) are participating via their respective devices that may be geographically remote from each other. The participant and the respective user (client) device, such as a computer, laptop, tablet, smart phone, etc., may collectively be referred to as endpoints, user devices, or devices. The devices may communicate with each other via one or more networks, such as the Internet.

Some of the devices may have video capabilities in a communication session. Video capabilities may include, but are not limited to, live feed of a respective participant on a user interface screen. Other devices may not have video capabilities in the communication session and may only have audio capabilities. Further, some of the devices may have interactive connectivity to manipulate content on the user interface screen and other devices may have view-only capability to be able only to view content during the collaboration session. These are just some examples and are not provided by way of a limitation.

A user may participate in a communication session by connecting a user device via a monitor connection (e.g., Universal Serial Bus Type-C (USB-C), High-Definition Multimedia Interface (HDMI), Digital Visual Interface (DVI), Video Graphics Array (VGA), etc.) or via another connection (e.g., a wireless connection) to a videoconference endpoint. The user may share content from the user device via the videoconference endpoint. When sharing content in a meeting from a meeting client running natively on the user device, many meeting applications allow the user to share the entire screen, share just a specific application or applications, or share a specific portion of the screen. Sharing a specific portion of the screen may be useful for users who do not want to have other applications displayed to other participants or for situations in which the application window consumes only a portion of the screen and the user would like the application being shared to take up all of the available screen real estate on the devices receiving the stream.

When content is shared into an online meeting or communication session through a videoconference endpoint that is receiving content in an output from a user device and streaming the output to the meeting, the videoconference endpoint cannot differentiate between applications running on the user device or between different windows displayed on a display of the user device. Therefore, in many instances, the videoconference endpoint will share the whole screen displayed on the user device. This may frustrate users who would like to share just a single application window or other limited content, instead of sharing the entire screen.

Reference is first made to FIG. 1. FIG. 1 shows a block diagram of a system 100 that is configured to provide online meeting services that include services for sharing content from a user device via a videoconference endpoint. The system 100 includes one or more meeting server(s) 110, a plurality of participant devices 150-1 to 150-N that communicate with meeting server(s) 110 via one or more networks 130, and a user device 120 that is connected to videoconference endpoint 140. The meeting server(s) 110 are configured to provide an online meeting service for hosting a communication session among videoconference endpoint 140 and participant devices 150-1 to 150-N. The user device 120 may be a tablet, laptop computer, desktop computer, Smartphone, virtual desktop client, or any user device now known or hereinafter developed that can connect to videoconference endpoint 140 and can be used to provide content to be shared by the videoconference endpoint 140 in the online meeting. The user device 120 may have a dedicated physical keyboard or touch-screen capabilities to provide a virtual on-screen keyboard to enter text.

Videoconference endpoint 140 may be a device configured to communicate with meeting server(s) 110 via network(s) to participate in an online meeting or communication session. In one example, videoconference endpoint 140 may connect to one or more user devices, such as user device 120, to facilitate the user device participating in the online meeting or communication session. For example, a user may share content from user device 120 with other participants (e.g., participant devices 150-1 to 150-N) in the online communication session via videoconference endpoint 140. In another example, a user may participate in an online meeting using videoconference endpoint 140 without a user device. Videoconference endpoint 140 may have one or more interfaces (e.g., a touchscreen interface or another interface) configured to receive inputs from a user. Videoconference endpoint 140 may additionally include a display 142 or means for connecting to a display for displaying video or graphical information associated with an online meeting. In addition, the videoconference endpoint 140 may include one or more video cameras 144 to capture video of one or more participants, one or more microphones 146 to capture audio from the one or more participants, and one or more loudspeakers 148 to project audio to the one or more participants from one or more remote participants.

Videoconference endpoint 140 may be connected to endpoint controller unit 160. Endpoint controller unit 160 includes display 162 for displaying information associated with videoconference endpoint 140. Endpoint controller unit 160 may be configured to receive inputs from a user (e.g., using display 162 if display 162 is a touchscreen display) for controlling actions associated with videoconference endpoint 140. As discussed below, endpoint controller unit 160 may present options to a user for selecting a window to share with participant devices 150-1 to 150-N.

Participant devices 150-1 to 150-N may be user devices and may include the features discussed with respect to user device 120. Participant devices 150-1 to 150-N may be videoconference endpoints and may include the features described above with respect to videoconference endpoint 140. Participant devices 150-1 to 150-N may be any devices configured to participate in an online meeting or communication session (e.g., using a client meeting application) and display content shared from user device 120. The network(s) 130 may include wired local and wide-area networks as well as wireless local and wide-area networks. The user device 120 and participant devices 150-1 to 150-N may also have short-range wireless system connectivity (such as Bluetooth™ wireless system capability, ultrasound communication capability, etc.) to enable local wireless connectivity with a videoconference endpoint in a meeting room or with other user devices in the same meeting room.

At a high level, these techniques presented herein involve sharing content from user device 120 with participant devices 150-1 to 150-N via videoconference endpoint 140. More specifically, these techniques presented herein involve sharing particular windows generated by user device 120 and displayed on display 142 of videoconference endpoint 140 with participant devices 150-1 to 150-N and performing actions when another window overlaps with the window being shared by user device 120.

Figure 2:
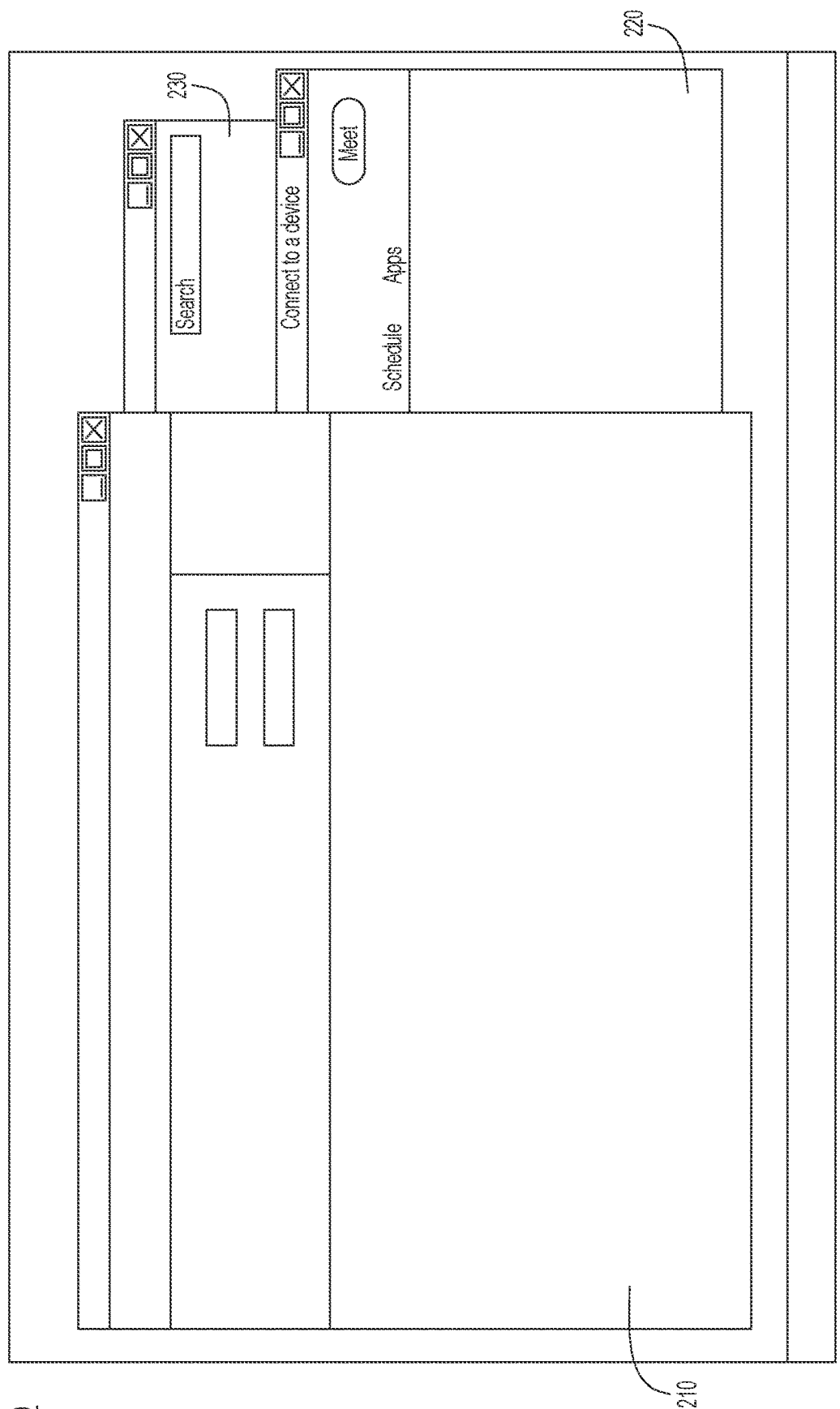
FIG. 2 is a diagram depicting windows displayed on a display of a user device, according to an example embodiment.

Reference is now made to FIG. 2, with continued reference to FIG. 1. FIG. 2 is a diagram depicting exemplary content 200 displayed on a display of user device 120, according to an example embodiment.

In the example illustrated in FIG. 2, a user may be participating in an online meeting using videoconference endpoint 140 and user device 120 may be connected to videoconference endpoint 140. In this example, an input with a video stream from an analog or digital monitor output (or a wireless output) of user device 120 may be received at videoconference endpoint 140. User device 120 may be running an operating system such as Windows®, macOS®, Linux®, or another operating system that has a typical windowed graphical user interface. For example, a user may view content 200 generated by user device 120 and presented on display 142 of videoconference endpoint 140. Content 200 may include three different windows—window 210, window 220, and window 230. As illustrated in FIG. 2, window 220 overlaps window 230 and window 210 overlaps windows 220 and 230. Because the windows are overlapping, all of window 210 may be viewed on display 142, but only portions of windows 220 and 230 may be viewed.

At some point during the meeting, the user may decide to share content from user device 120 with participant devices 150 participating in the online meeting. In this example, the content is shared from user device 120 via videoconference endpoint 140. When the user indicates that content is to be shared, the user is presented with an option to share the whole screen or to share an application or window. The option may be presented on display 162 of endpoint controller unit 160 associated with the videoconference endpoint 140 or overlaid on a display 142 of videoconference endpoint 140.

If the user indicates that a specific window is to be shared, windows and portions of windows displayed on user device 120 are detected. In one embodiment, the video stream is sent through an object recognition algorithm associated with videoconference endpoint 140 that is trained to detect windows and portions of windows. In another embodiment, as described below with respect to FIGS. 8-10, a helper application installed on user device 120 may be used to identify the windows and portions of windows. After the windows are detected, as described below with respect to FIG. 3, videoconference endpoint 140 overlays markers indicating the detected windows.

Figure 3:
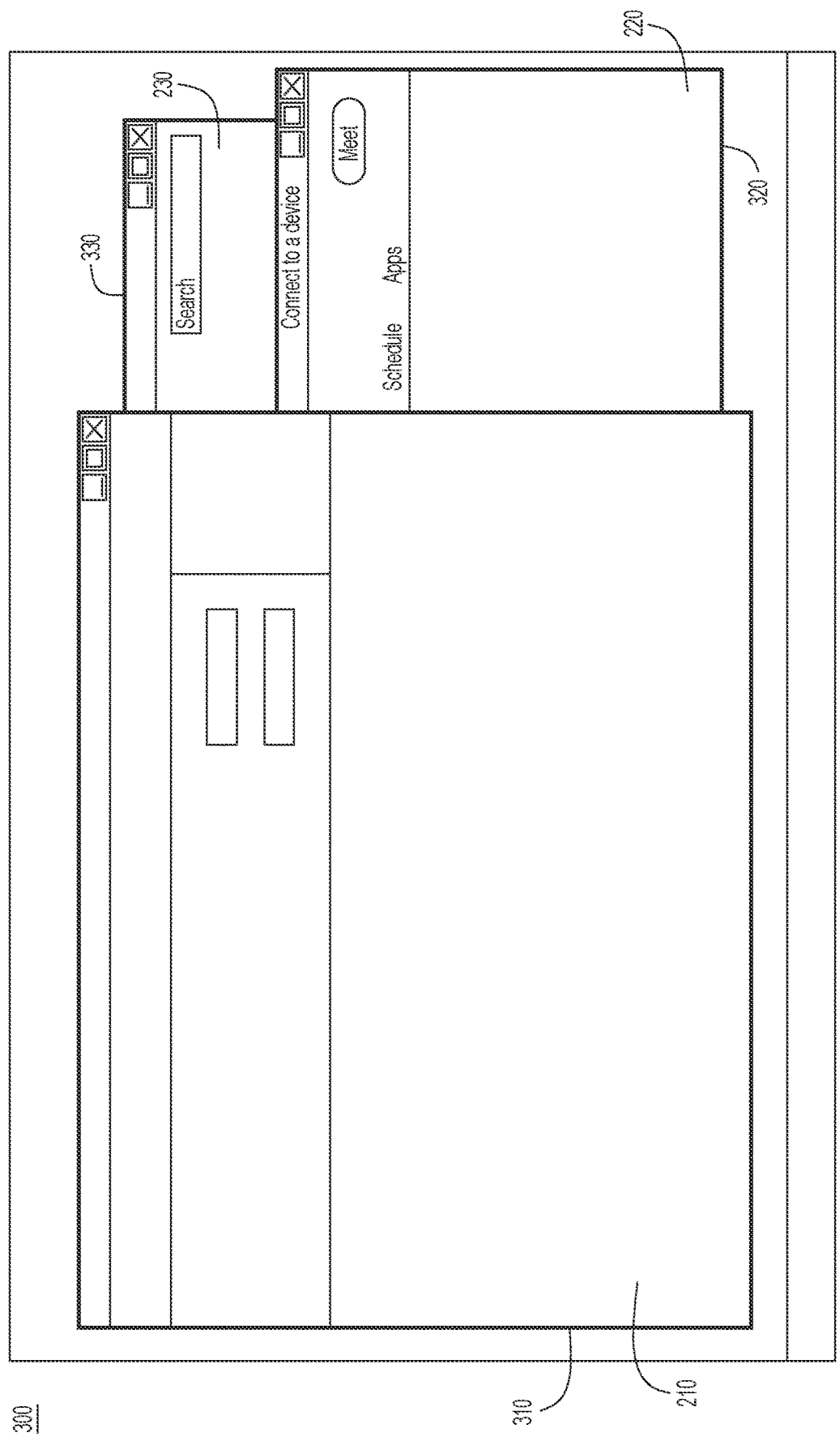
FIG. 3 is a diagram depicting markers identifying windows that are displayed on a display of a user device, according to an example embodiment.

Reference is now made to FIG. 3, with continued reference to FIGS. 1 and 2. FIG. 3 is a diagram depicting an environment 300 displayed on a display 142 of videoconference endpoint 140 after the video stream received from user device 120 is passed through the object recognition algorithm in response to a user indicating that a specific window is to be shared, according to an example embodiment.

As illustrated in FIG. 3, markers indicating separate windows that are generated by user device 120 and displayed on display 142 are overlaid on the windows detected by the object recognition algorithm. For example, marker 310 is overlaid on window 210, marker 320 is overlaid on window 220, and marker 330 is overlaid on window 230. If the object recognition algorithm is used to detect the windows, the object recognition algorithm will be running continuously to keep track of windows on the screen and, while the user is being prompted to select which window to share, the algorithm detects changes in locations and/or sizes of the windows (e.g., windows 210, 220, and 230). If a location or size of a window changes, the overlaid outlines/marker associated with the window will dynamically change to highlight the edges of the window. If a window is closed, the marker/outline around the window will disappear. If a new window appears, the new window will be detected by the object recognition algorithm and a new outline/marker will be displayed around the new window.

When the object recognition algorithm detects the windows, the user may be given an option to select the window the user wishes to share. In one embodiment, if videoconference endpoint 140 is equipped with a touchscreen (e.g., display 142 is a touchscreen), a user may choose the window to share by touching the desired window on the touchscreen. In another embodiment, if the videoconference endpoint 140 is not equipped with a touchscreen, indicators identifying the different detected windows may be overlaid on the detected windows, as described below with respect to FIG. 4, and a user may select the desired window to be shared by making a selection on another interface, such as endpoint controller unit 160.

Figure 4:
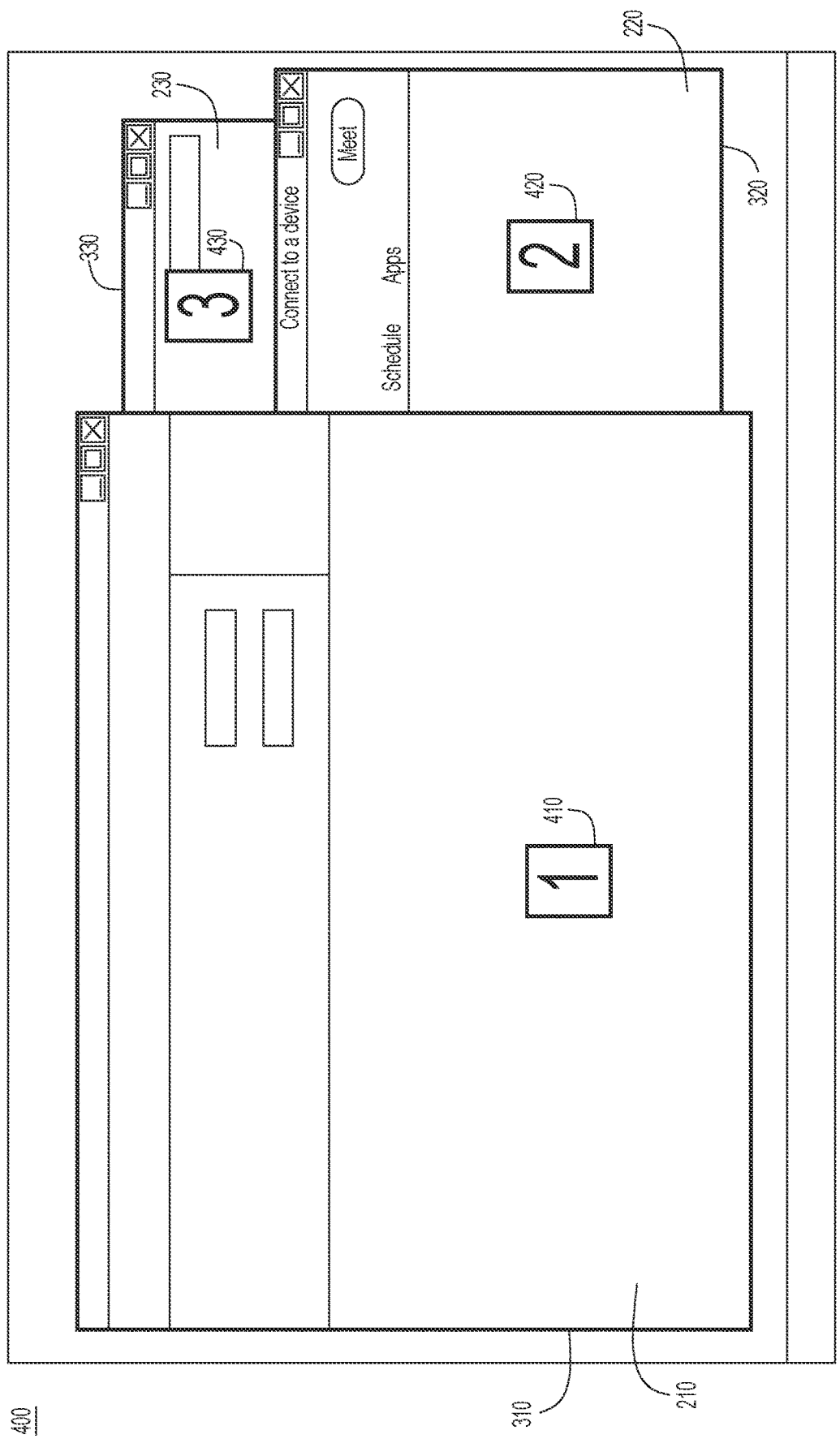
FIG. 4 is a diagram depicting identifiers for selecting a window displayed on a display of a user device, according to an example embodiment.

Reference is now made to FIG. 4, with continued references to FIGS. 1-3. FIG. 4 is a diagram depicting an environment 400 displayed on a display 142 of a videoconference endpoint 140 including indicators for identifying a window to be shared, according to an example embodiment.

In the example illustrated in FIG. 4, indicator 410 (illustrated as a "1" surrounded by a box) identifies window 210, indicator 420 (illustrated as a "2" surrounded by a box) identifies window 220, and indicator 430 (illustrated as a "3" surrounded by a box) identifies window 230. As illustrated in FIG. 4, markers 310, 320, and 330 continue to be overlaid around windows 210, 220, and 230, respectively.

If a user desires to share window 210 and videoconference endpoint 140 is not equipped with a touchscreen by which the user may select window 210, the user may press "1" or choose "1" in another manner using a separate interface (e.g., by pressing a button marked "1"). In a similar manner, if the user desires to share window 220, the user may select a "2" on a separate interface and if the user desires to share window 230, the user may select a "3" on a separate interface.

When the user has selected the window of the application to share, either through a touch selection or through selecting the window using another interface, videoconference endpoint 140 may identify the x and y coordinates of the area that bounds the desired window and crop the image of the screen to include only the portion of the video stream inside the area that bounds the desired window. The cropped image is sent via a sharing window of the meeting connection so participant devices 150 are able to view the content inside the desired window, as described below with respect to FIG. 5.

Figure 5:
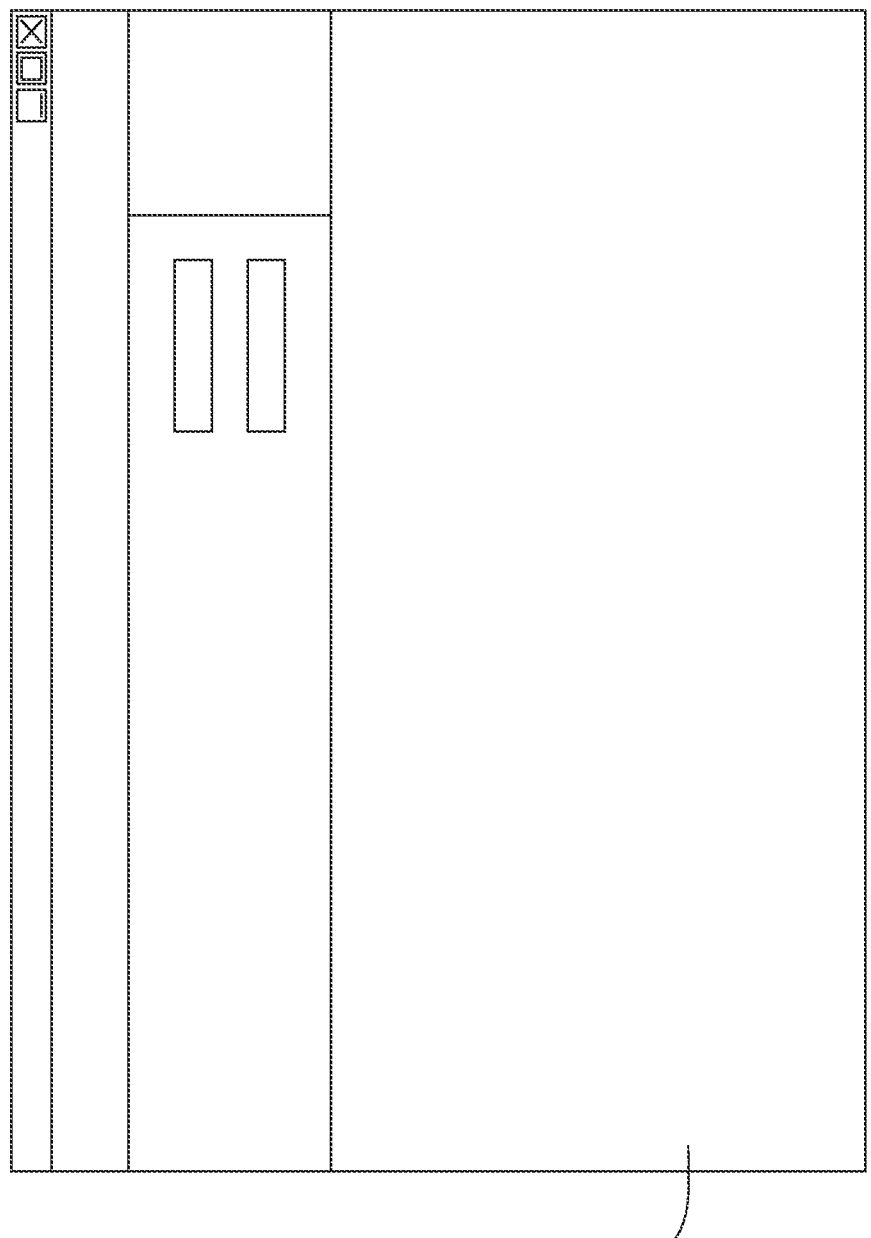
FIG. 5 is a diagram depicting content of a selected window that is shared, according to an example embodiment.

Reference in now made to FIG. 5, with continued reference to FIGS. 1-4. FIG. 5 is a diagram depicting an environment 500 displayed on a display of participant devices 150-1 to 150-N, according to an example embodiment.

In the example illustrated in FIG. 5, a user has chosen to share the content in window 210. For example, the user has chosen window 210 on a touchscreen of videoconference endpoint 140 or has selected "1" on another interface. The x and y coordinates of the area surrounding window 210 have been determined and the content displayed on a display of user device 120 has been cropped to include only the content inside the area that bounds window 220. The cropped image has been sent via the sharing window and environment 500, which includes window 210, is displayed on a portion of the displays of participant devices 150-1 to 150-N. As illustrated in FIG. 5, the content of window 210 is shared and no other content generated by user device 120 is shared with participant devices 150-1 to 150-N.

In one embodiment, the user who is sharing the content from user device 120 continues to see additional content on the display 142 of videoconference endpoint 140. For example, if user device 120 is a computer, the user may continue to see the entire desktop, which may include windows 220 and 230 and/or additional content. In addition, videoconference endpoint 140 may continue to display an overlay of the outline of the shared window (e.g., window 210) to indicate that the user continues to share the window. Videoconference endpoint 140 may optionally upscale the video or window being shared to a more standard resolution before sending the video stream to the meeting server(s) 110. Alternatively, videoconference endpoint 140 may share the content at the provided resolution of the resulting cropped image and allow the remote systems receiving the shared content (e.g., participant devices 150-1 to 150-N) to upscale or downscale as needed. In yet another embodiment, the videoconference endpoint 140 may send the full screen resolution of the screen provided by user device 120, but replace the areas outside the window being shared with some other content, such as a solid white or black background.

The videoconference endpoint 140 may continue to analyze the stream received from user device 120 for changes to the window that was selected (e.g., window 210). The videoconference endpoint 140 may look for several changes. For example, the videoconference endpoint 140 may determine if the window was moved or resized. If the shared window was moved to another location on the screen, the new location of the shared window is detected and the shared area is changed to reflect the area of the new location. If the shared window is resized, the shared resolution is adjusted to accommodate the new size of the shared window. The adjustment of the resolution may also occur if the shared window is partially moved off the screen, thereby cropping a part of the shared window.

In another example, the shared window may be minimized or closed. When the shared window is closed, the videoconference endpoint 140 may stop sharing altogether or may share a blank screen. Sharing a blank screen may be useful if the user has minimized the shared screen temporarily, but wishes to continue sharing the window again later. In this example, the videoconference endpoint 140 may keep a record of contents of the shared window in order to detect the shared window if it reappears. In this case, the videoconference endpoint 140 may detect the shared window if it reappears even if the window contents are not identical to the contents of the window when the window was minimized.

To perform the detection of the window when the contents differ after the window is minimized, a machine learning (ML) model may be trained on ways to detect whether a window is the same as a previous window. For example, the ML model may be trained on features that can uniquely identify a window on common operating systems. Alternatively, the videoconference endpoint 140 may ask the user to re-indicate which window to share if the videoconference endpoint 140 cannot recognize a window that was reopened. For example, a window displaying a video may look different when the window reappears after being minimized (e.g., while the video continues to play), but the window headers may be unique enough to identify it as the same window.

Figure 6:
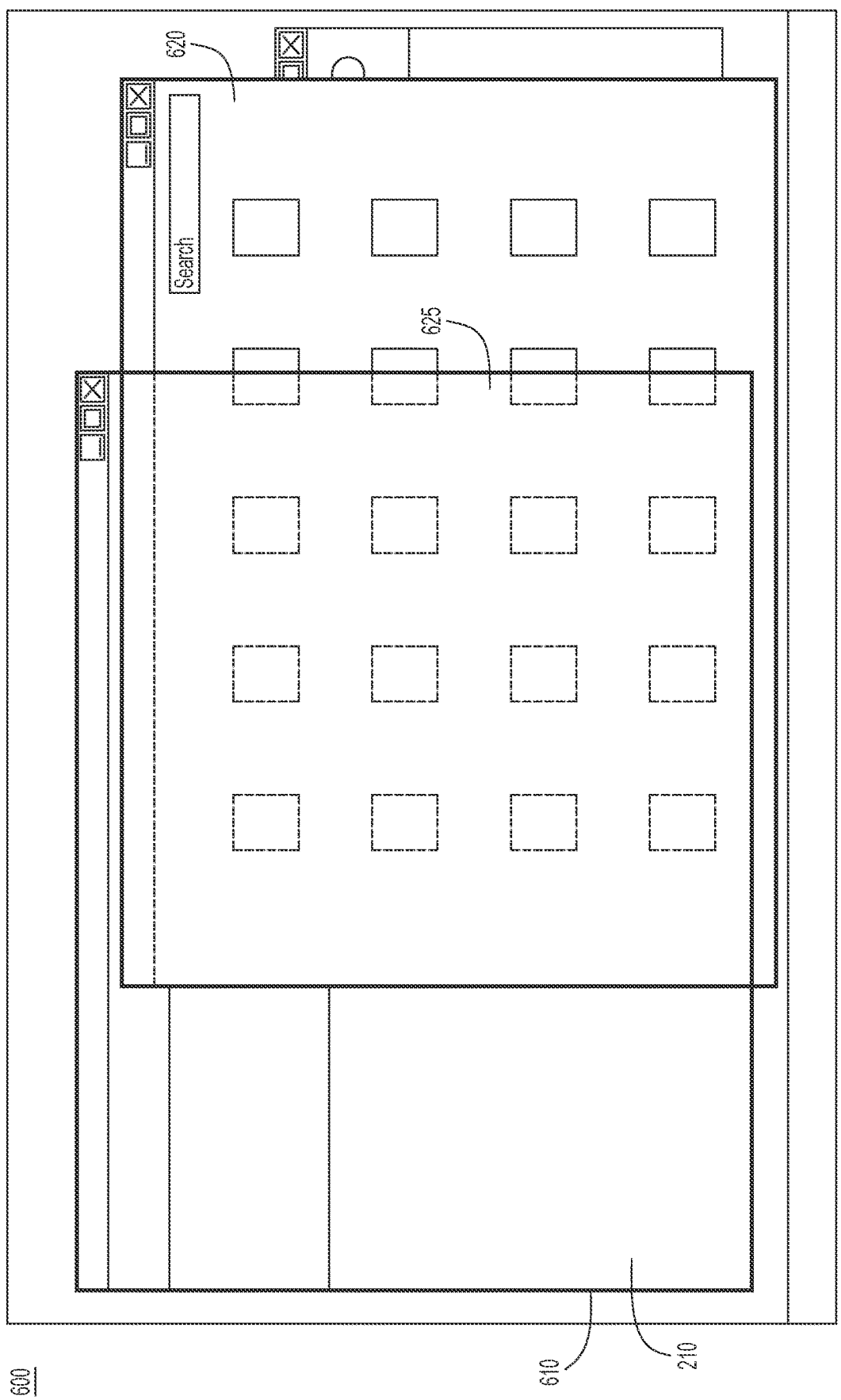
FIG. 6 is a diagram depicting a window overlapping a shared window, according to an example embodiment.

Reference in now made to FIG. 6, with continued reference to FIGS. 1-5. FIG. 6 is a diagram depicting an environment 600 displayed when a second window overlaps with the shared window, according to an example embodiment.

As discussed with respect to FIG. 6, in one embodiment, another window may be moved to cover or overlap a portion of the shared window. In this embodiment, the object recognition algorithm may detect that another window is now overlapping the selected window by detecting that the area of the original window now has another window intersecting with it. Since the shared window is rectangular in shape and the user may not want to share the contents of the overlapping window, a determination is made as to what action to take with respect to the content of the overlapping window.

In the example illustrated in FIG. 6, a user is sharing window 210 and window 620 is moved to cover a part of window 210. For example, portion 625 of window 620 is overlapping a portion of window 210. In this example, the object recognition algorithm detects that area 610 surrounding window 210 now has another window intersecting it. In another example, a popup window (e.g., a message notification popup from a messaging application or another application) may appear on top of the window being shared.

In these examples, videoconference endpoint 140 continues to share the content inside area 610 (since the shared content is rectangular in shape), but videoconference endpoint 140 takes measures to hide the contents of the portion 625 of overlapping window 620. Videoconference endpoint 140 may take one of a few options to hide the contents in portion 625.

In one embodiment, the contents of the shared window 210 from a previous sampling may be taken and the previous contents may be shared with participant devices 150-1 to 150-N. As described above, a record of the contents of the window may be recorded for a period of time. In this scenario, the recorded contents of the shared window 210 may be displayed over the entire shared window 210 so the previous contents of the shared window are shared at participant devices 150-1 to 150-N and the overlapping portion 625 of window 620 is obscured. Alternatively, the current contents of the portion of the shared window 210 that is not overlapped are shared and the previous contents of the shared window 210 that is being overlapped (e.g., the contents of window 210 covered by portion 625 of window 620) is shared. For example, videoconference endpoint 140 may replace the contents of the portion 625 of window 620 with contents that were previously displayed in this section of window 210. In this way, contents of the window 620 are not shared while contents of the shared window 210 are still shared.

In another embodiment, videoconference endpoint 140 may recognize that the window being shared (e.g., window 210) is no longer in the foreground because the second window (e.g., window 620) is overlapping the shared window 210 and videoconference endpoint 140 may determine not to share content of window 210 until the window 210 returns to the foreground. In this embodiment, the videoconference endpoint 140 may discontinue sharing the contents altogether or may share a blank screen.

In still another embodiment, as described below with respect to FIG. 7, the contents of the overlapping window may be hidden by overlaying a color or pattern.

Figure 7:
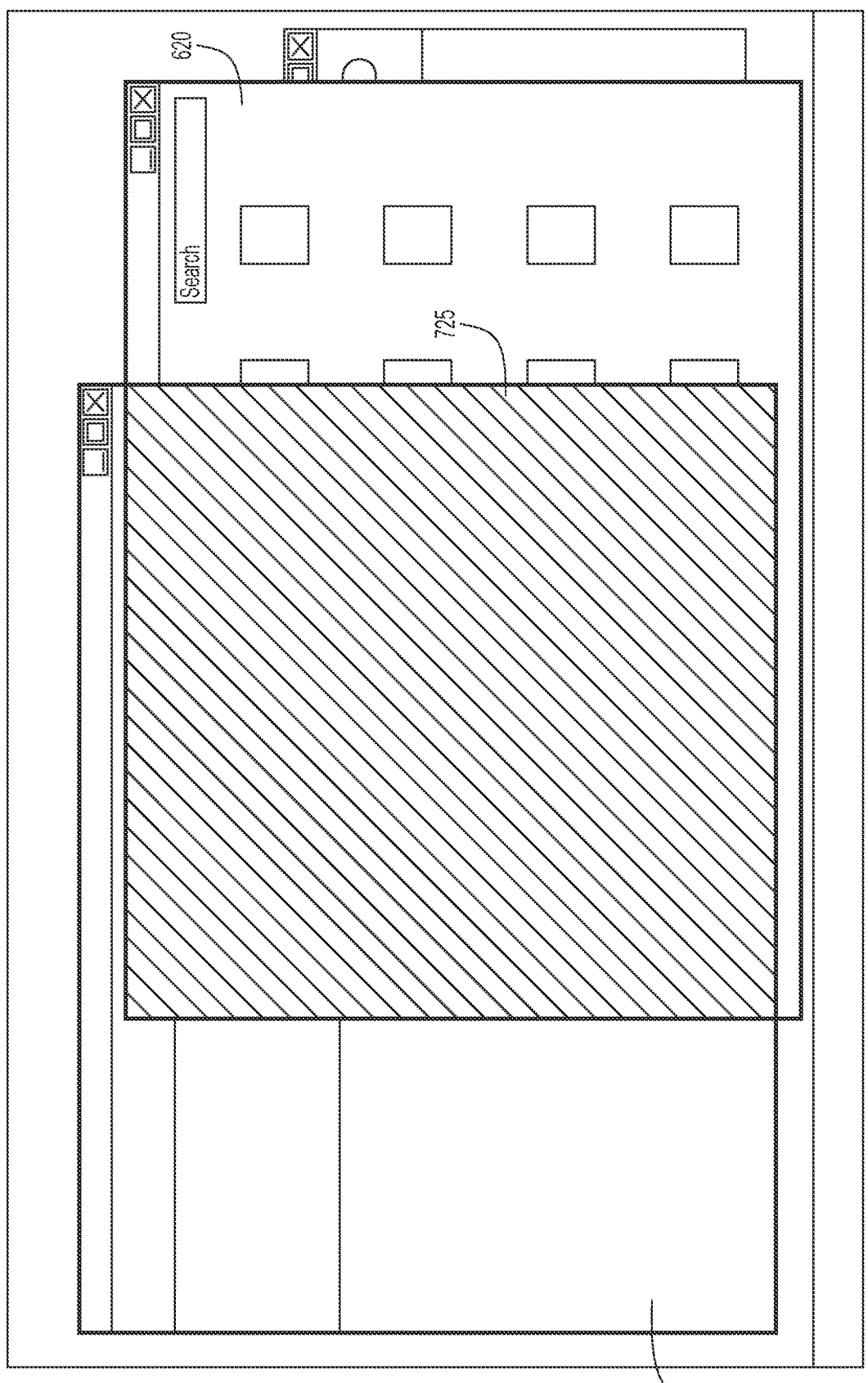
FIG. 7 is a diagram depicting obscuring content from a window that overlaps a shared window, according to an example embodiment.

Reference in now made to FIG. 7, with continued reference to FIGS. 1-6. FIG. 7 is a diagram depicting an environment 700 in which a color or pattern is overlaid when a second window overlaps with the shared window, according to an example embodiment.

Referring to FIG. 7, window 620 may have been moved so that portion 725 of window 620 is overlapping shared window 210. In this example, portion 725 has been overlaid with a color or pattern so that the content of window 620 that is overlapping window 210 is hidden. In this example, the content shared with participant devices 150-1 to 150-N will include the portion of window 210 that is not obscured by window 620 and the color or pattern obscuring portion 725 of window 620.

Figure 8:
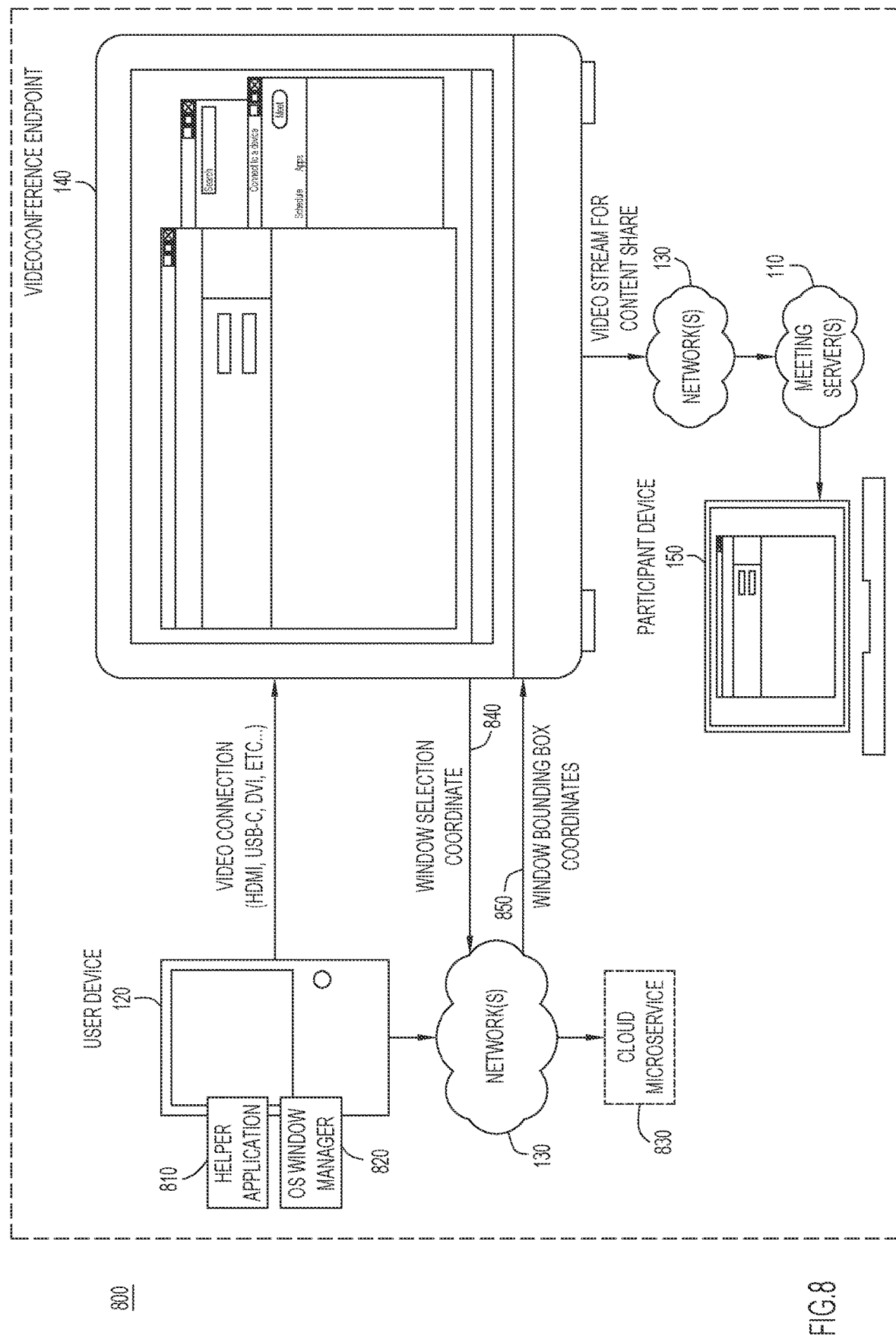
FIG. 8 is a diagram of a system configured to determine windows displayed on a display of a user device using a helper application installed on the user device, according to an example embodiment.

Reference is now made to FIG. 8, with continued references to FIGS. 1-7. FIG. 8 is a diagram depicting an environment 800 in which a helper application is installed on user device 120 to help determine the locations of the windows being generated by user device 120. Environment 800 includes meeting server(s) 110, user device 120, network(s) 130, videoconference endpoint 140, participant device 150, and a helper application 810, an operating system (OS) windows manager 820 and a cloud microservice 830.

In the example described in FIG. 8, helper application 810 and OS windows manager 820 are installed on user device 120. In one embodiment, helper application 810 is running on user device 120 and the user of user device 120 does not interact with helper application 810. In another embodiment, helper application 810 may interact with the user of user device 120 to determine which window the user would like to share. Helper application 810 interacts with OS windows manager 820 and provides a list of windows and their coordinates to videoconference endpoint 140 in response to a request from videoconference endpoint 140. In addition, helper application 810 provides continuous updates to a set of shared windows when videoconference endpoint 140 initiates a share screen.

As illustrated in FIG. 8, a user of user device 120 indicates a desire to share an application window. For example, the user may select an option on videoconference endpoint 140 indicating that the user would like to start sharing a window and the user may select the window to share (e.g., by touching the window on display 142 or by selecting a point within the bounds of the desired window in another manner). At 840, videoconference endpoint 140 sends a window selection coordinate request to user device 120 requesting coordinates of the windows displayed on user device 120. In one embodiment, the window selection coordinate request may be transmitted via a signaling agent such as cloud microservice 830. Helper application 810 interacts with OS windows manager 820 to determine the coordinates of the bounds of the windows generated by user device 120 and displayed on display 142. In one embodiment described below with respect to FIG. 9, helper application 810 additionally obtains a selection of a window to share from the user.

At 850, helper application 810 transmits the window bounding box coordinates to videoconference endpoint 140. In one example, the window bounding box coordinates may include a list of all windows with bounding paths for each window. In another example, the window bounding box coordinates may include the coordinates bounding the window that the user has selected to share. In another example, user device 120 may send the coordinates bounding the window that the user has selected to share through a signaling agent such as cloud microservice 830.

If the videoconference endpoint 140 obtains the list of all windows with the bounding paths for each window, the videoconference endpoint 140 may request that the user select a window to share. When the user selects a window to share or if user device 120 has transmitted the coordinates bounding the window that the user has selected to share, videoconference endpoint 140 initiates a video stream with the content in the window that the user has selected. As described above, videoconference endpoint 140 crops the content displayed on user device 120 and the content within the selected window is shared. Videoconference endpoint 140 shares the content within the selected window with participant devices 150-1 to 150-N via network(s) 130 and/or meeting server(s) 110.

Figure 9:
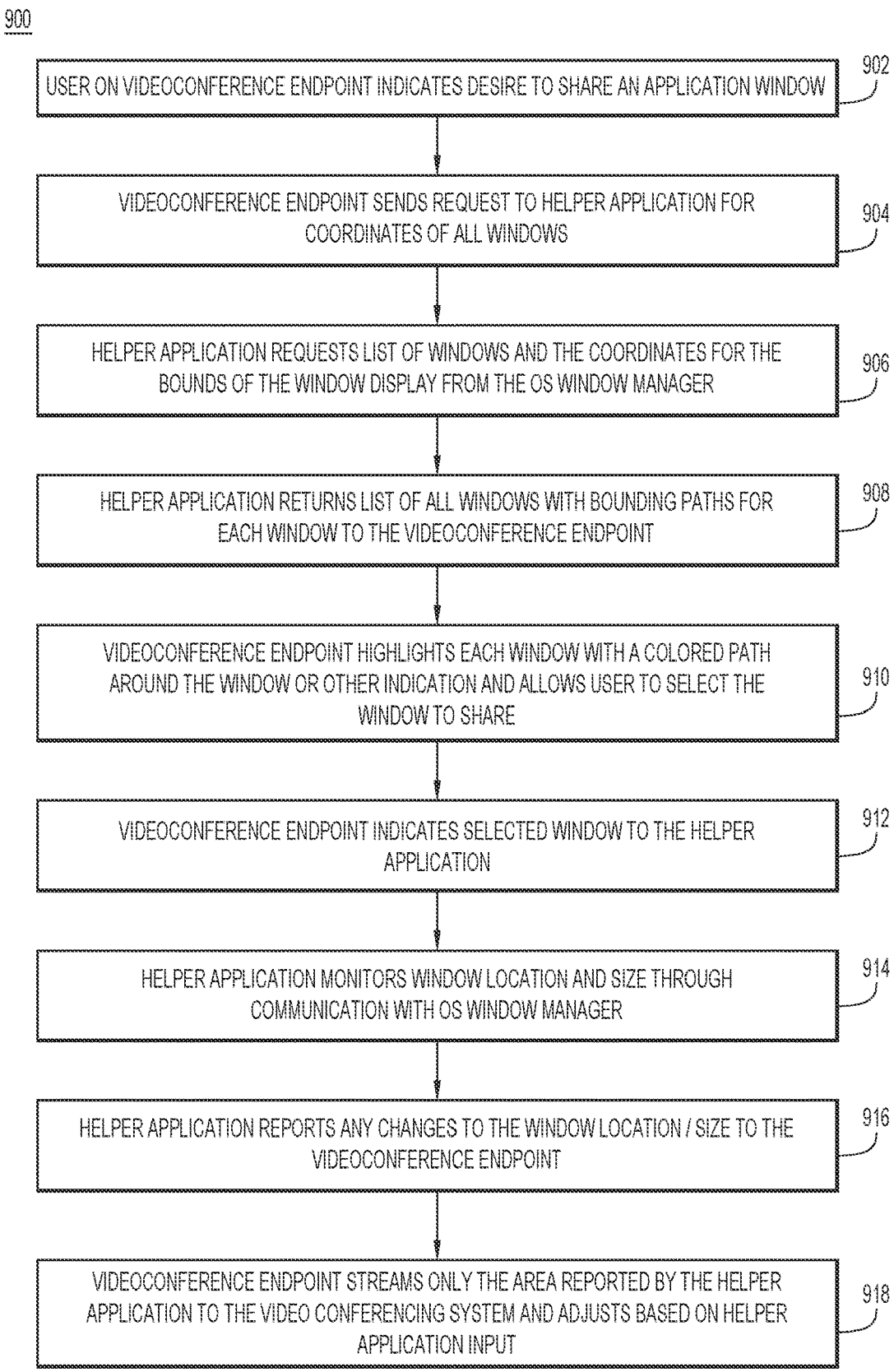
FIG. 9 is a flowchart illustrating a method for receiving coordinates of windows displayed on a display of a videoconference endpoint from a helper application installed on the user device, according to an example embodiment.

Referring to FIG. 9, FIG. 9 is a flow diagram illustrating a method 900 of communicating the current state and location of windows managed by an operating system on user device 120 using helper application 810 without a user interacting with helper application 810. The method 900 may be implemented by user device 120 and videoconference endpoint 140, and thus reference is also made to FIGS. 1 and 8 for purposes of the description of FIG. 9.

At 902, the method 900 involves receiving an indication that a user of user device 120 desires to share an application window. For example, the user device 120 may be connected to videoconference endpoint 140 for participating in an online meeting or communication session and a user may select an option on videoconference endpoint 140 to indicate that the user desires to share a window from user device 120 that is being displayed on display 142.

At 904, the videoconference endpoint 140 may send a request to the helper application 810 for coordinates of all of the windows currently being generated by user device 120. For example, user device 120 may generate one or more windows that are displayed on display 142 of videoconference endpoint 140. At 906, helper application 810 interacts with OS window manager 820 to request a list of the windows generated by user device 120 and displayed on display 142 of videoconference endpoint 140 and the coordinates for the bounds or outline of the windows.

Helper application 810 obtains the list of the windows and the coordinates for the bounds of the windows, and, at 908, helper application 810 transmits the list of the windows and the bounding paths for each window to the videoconference endpoint 140. At 910, videoconference endpoint 140 highlights each window with a color path around the window or provides another indication to allow the user to select a window to share.

At 912, videoconference endpoint 140 indicates to helper application 810 that the selected window has been selected and is being shared. At 914, helper application 810 monitors the location and size of the shared window through communication with OS window manager 820. Helper application 810 additionally monitors whether any areas of another window are overlapping with the shared window. At 916, helper application 810 reports to videoconference endpoint 140 any changes to the location and/or size of the shared window. Helper application 810 continuously updates the coordinates of the window being shared when the window is moved or resized and reports the updated coordinates to videoconference endpoint 140. Helper application 810 additionally reports to videoconference endpoint 140 if any window is overlapping the shared window so that videoconference endpoint 140 may take one or more actions.

At 918, videoconference endpoint 140 streams the area reported by the helper application 810 to participant devices 150-1 to 150-N, via meeting server 110. Videoconference endpoint 140 adjusts the content being streamed based on input from helper application 810. For example, if the size and/or location of the shared window changes, videoconference endpoint 140 adjusts the content being streamed based on the updated coordinates so that the content inside the selected window is streamed to participant devices 150-1 to 150-N.

Referring to FIG. 10, FIG. 10 is a flow diagram illustrating a method 1000 of communicating the current state and location of windows managed by an operating system on user device 120 in which helper application 810 interacts with a user. The method 1000 may be implemented by user device 120 and videoconference endpoint 140. Reference is also made to FIGS. 1 and 8 for purposes of the description of FIG. 10.

At 1002, the method 1000 involves receiving an indication that a user of user device 120 desires to share an application window. For example, the user device 120 may be connected to videoconference endpoint 140 for participating in an online meeting or communication session and a helper application 810 installed on user device 120 obtains an indication that the user wants to share a window generated by user device 120 and displayed on display 142 of videoconference endpoint 140.

At 1004, helper application 810 interacts with OS window manager 820 and requests a list of windows displayed on user device 120 and the coordinates of the bounds of the window. At 1006, helper application 810 requests that the user select which window to share. For example, the helper application 810 may ask the user to touch the window to share on user device 120, click on the window to share on user device 120, or select the window to share on user device 120 in another way.

At 1008, helper application 810 monitors the location and size of the selected window through communication with OS window manager 820 to determine whether the size and/or location has changed. At 1010, helper application 810 communicates with videoconference endpoint 140 to indicate that videoconference endpoint 140 is to initiate a sharing session using the selected window. Helper application 810 additionally transmits to videoconference endpoint 140 the coordinates of the window to be shared.

At 1012, videoconference endpoint 140 begins sharing the selected window and streams the area reported by the helper application 810. For example, videoconference endpoint 140 obtains the coordinates of the selected window and crops the content displayed on display 142 to include the area inside the bounds or coordinates of the selected window. Videoconference endpoint 140 shares the contents inside the bounds or coordinates of the selected window.

At 1014, helper application 810 continues to monitor the location and size of the shared window through communication with OS window manager 820. Helper application 810 continuously monitors the size and location of the shared window and updates the coordinates of the window if the shared window has moved or been resized. Helper application 810 additionally monitors whether any areas of another window are overlapping with the shared window. At 1016, helper application 810 reports any changes to the location and/or size of the shared window to the videoconference endpoint 140. If the shared window has been moved or resized, helper application 810 reports the new coordinates of the shared window to videoconference endpoint 140. Helper application 810 additionally reports to videoconference endpoint 140 if any window is overlapping the shared window so that videoconference endpoint 140 may take one or more actions.

At 1018, the videoconference endpoint 140 streams the area reported by the helper application 810 to participant devices 150 and adjusts the content being streamed based on input from the helper application 810. For example, if the size and/or location of the shared window changes, helper application 810 reports the new coordinates of the shared window to videoconference endpoint 140 and videoconference endpoint 140 shares the content inside the bounds of the new coordinates to participant devices 150.

Referring to FIG. 11, FIG. 11 is a flow diagram illustrating a method 1100 of sharing a selected window from a user device in an online meeting via a videoconference endpoint. The method 1100 may be implemented by a user device 120 and a videoconference endpoint 140. For example, the videoconference endpoint 140 may implement the method 1100 based on information received from user device 120. Reference is also made to FIGS. 1-10 for purposes of the description of FIG. 11.

At 1102, the method 1100 involves receiving a request to share content generated by user device 120 and displayed on display 142 of videoconference endpoint 140 with one or more participant devices 150-1 to 150-N. The user device 120 is connected to videoconference endpoint 140 and videoconference endpoint 140 is participating in a communication session with the one or more participant devices 150-1 to 150-N. User device 120 is connected to videoconference endpoint 140 through a wired or wireless connection and a user of user device 120 is participating in the communication session via the videoconference endpoint 140.

At 1104, the method 1100 involves detecting one or more windows displayed on the display of the user device. For example, videoconference endpoint 140 may detect one or more windows generated by user device 120. In one embodiment, the videoconference endpoint 140 may detect the one or more windows using an object recognition algorithm. In another embodiment, videoconference endpoint 140 may detect the one or more windows based on an input from a helper application 810 installed on user device 120.

At 1106, the method 1100 involves receiving a selection of a first window of the one or more windows to share. For example, the videoconference endpoint 140 may receive a user selection of a window to share based on receiving an input on a touchscreen, another interface, or from the helper application 810 installed on user device 120.

At 1108, the method 1100 involves sharing contents of the first window with the one or more participant devices. For example, videoconference endpoint 140 may share the contents of the selected window with participant devices 150-1 to 150-N.

At 1110, the method 1100 involves detecting that a second window is overlapping the first window on the display 142 such that a first portion of the first window is covered by a second portion of the second window. For example, a window generated by user device 120 and displayed on the display 142 of videoconference endpoint 140 may be moved so that a part of the window is on top of the window being shared. As another example, a popup window may appear on the display of the user device 120 and the popup window may be covering a portion of the selected window. Videoconference endpoint 140 may detect that the window is covering the shared window. In another implementation, helper application 810 may report to videoconference endpoint 140 that a window is covering the shared window.

At 1112, the method 1100 involves performing one or more actions with respect to the second portion of the second window that is covering the first portion of the first window. For example, videoconference endpoint 140 may take contents of the shared window from a previous sampling and continue to display the previous contents of the shared window. In another example, videoconference endpoint 140 may recognize that the window being shared is no longer at the foreground and stop sharing until the shared window returns to the foreground. In another example, videoconference endpoint 140 may obscure the contents of the second window that is covering the first window by overlaying a color or pattern over the overlapping portion of the second window. In still another example the videoconference endpoint may identify previously displayed contents that were displayed in a first portion of a first window prior to a second portion of a second window cover the first portion of the first window. This would lead to replacing contents of the second portion of the second window with the previously displayed contents of the first window, and sharing contents of a third portion of the first window that is not covered by the second window and previously displayed contents of the first window.

Figure 12:
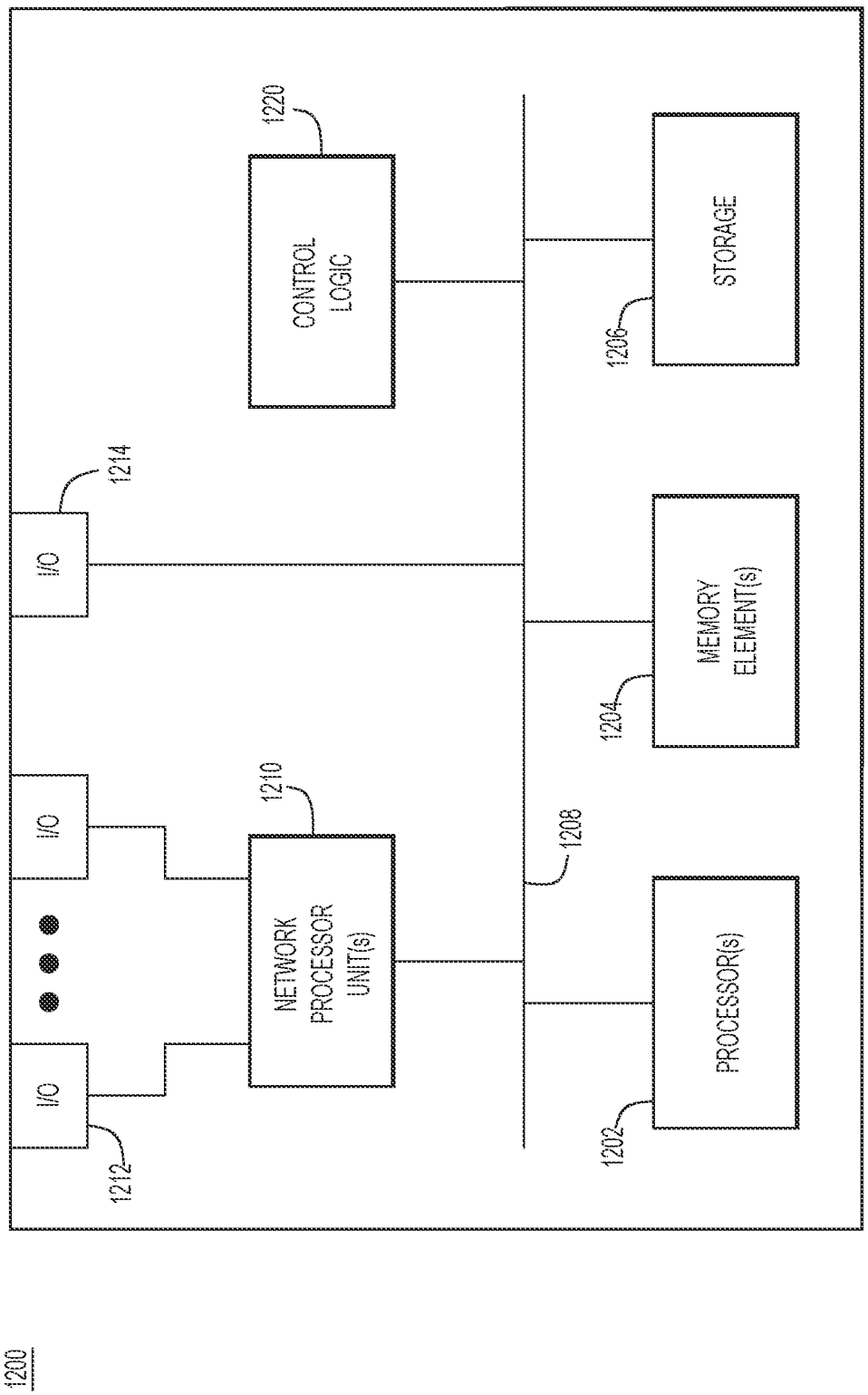
FIG. 12 is a hardware block diagram of a computer device that may be configured to perform the operations involved in sharing content from a user device via a videoconference endpoint, according to an example embodiment.

Referring to FIG. 12, FIG. 12 illustrates a hardware block diagram of a computing/computer device 1200 that may perform functions of a user device associated with operations discussed herein in connection with the techniques depicted in FIGS. 1-11. In various embodiments, a computing device, such as computing device 1200 or any combination of computing devices 1200, may be configured as any devices as discussed for the techniques depicted in connection with FIGS. 1-11 in order to perform operations of the various techniques discussed herein. The block diagram of FIG. 12 may be representative of a videoconference endpoint, e.g., videoconference endpoint 140 configured to perform the techniques presented herein, or a user device configured to perform the techniques presented herein (particularly those described in connection with FIGS. 8-10).

In at least one embodiment, the computing device 1200 may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for computing device 1200 can overlap in any manner and are not limited to the specific allocation of instructions and/or operations described herein.

In at least one embodiment, processor(s) 1202 is/are at least one hardware processor configured to execute various tasks, operations and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s)

1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1212 can be configured as one or more Ethernet port(s), Fibre Channel ports, any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other entities that may be connected to computer device 1200. For example, I/O interface(s) 1214 may provide a connection to external devices such as a keyboard, keypad, a touch screen, and/or any other suitable input and/or output device now known or hereafter developed. This may be the case, in particular, when the computer device 1200 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computer device 1200 serves as a user device as described herein. Additional external devices may include a video camera and microphone/speaker combination.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a method is provided comprising receiving, at a conference endpoint, a request to share content generated by a user device with one or more participant devices, wherein the user device is connected to the conference endpoint and the conference endpoint is participating in a communication session with the one or more participant devices; detecting one or more windows displayed on a display of the conference endpoint; receiving a selection of a first window of the one or more windows to share; sharing contents of the first window with the one or more participant devices; detecting that a second window is overlapping the first window on the display of the conference endpoint such that a first portion of the first window is covered by a second portion of the second window; and performing one or more actions with respect to the second portion of the second window that is covering the first portion of the first window.

In one example, performing the one or more actions comprises obscuring the second portion of the second window that is covering the first portion of the first window to form an obscured portion; and sharing the obscured portion of the second window and contents of a third portion of the first window that is not covered by the second window with the one or more participant devices. In another example, performing the one or more actions comprises identifying previously displayed contents of the first window that were displayed in the first portion of the first window prior to the second portion of the second window covering the first portion of the first window; replacing contents of the second portion of the second window with the previously displayed contents of the first window; and sharing contents of a third portion of the first window that is not covered by the second window and the previously displayed contents of the first window with the one or more participant devices. In another example, performing the one or more actions comprises discontinuing sharing the contents of the first window while the second window is overlapping the first window.

In another example, detecting the one or more windows further comprises receiving, from an application of the user device, an indication of states and locations of the one or more windows; and detecting the one or more windows based on the states and locations of the one or more windows. In another example, receiving the selection of the first window includes receiving, from the application of the user device, the selection of the first window. In another example, sharing the contents of the first window comprises: determining coordinates of an area that bounds the first window; cropping an image of overall content being displayed on the display of the conference endpoint to include content inside the area that bounds the first window and to exclude content outside the area that bounds the first window; and sharing the content inside the area that bounds the first window with the one or more participant devices. In another example, receiving the selection of the first window includes receiving, on an interface of the conference endpoint, a selection of an indicator associated with the first window.

In another form, an apparatus is provided comprising a memory; a network interface configured to enable network communications; and a processor, wherein the processor is configured to perform operations comprising: receiving a request to share content generated by a user device with one or more participant devices, wherein the user device is connected to the apparatus and the apparatus is participating in a communication session with the one or more participant devices; detecting one or more windows generated by the user device and displayed on a display of the apparatus; receiving a selection of a first window of the one or more windows to share; sharing contents of the first window with the one or more participant devices; detecting that a second window is overlapping the first window on the display of the apparatus such that a first portion of the first window is covered by a second portion of the second window; and performing one or more actions with respect to the second portion of the second window that is covering the first portion of the first window.

In still another form, one or more non-transitory computer readable storage media encoded with instructions are provided that, when executed by a processor, cause the processor to execute a method comprising: receiving a request to share content generated by a user device with one or more participant devices, wherein the user device is connected to a conference endpoint associated with the processor, and wherein the conference endpoint is participating in a communication session with the one or more participant devices; detecting one or more windows displayed on a display of conference endpoint; receiving a selection of a first window of the one or more windows to share; sharing contents of the first window with the one or more participant devices; detecting that a second window is overlapping the first window on the display of the conference endpoint such that a first portion of the first window is covered by a second portion of the second window; and performing one or more actions with respect to the second portion of the second window that is covering the first portion of the first window.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
receiving, at a conference endpoint, a request to share content with one or more participant devices, wherein the content is generated by a user device and displayed on a display of the conference endpoint, wherein the user device is connected to the conference endpoint and the conference endpoint is facilitating the user device participating in a communication session with the one or more participant devices;
detecting, by the conference endpoint, one or more windows generated by the user device and displayed on the display of the conference endpoint;
receiving, at the conference endpoint, a selection of a first window of the one or more windows to share;
sharing contents of the first window with the one or more participant devices;
detecting that a second window is overlapping the first window on the display of the conference endpoint such that a first portion of the first window is covered by a second portion of the second window; and performing one or more actions with respect to the second portion of the second window that is covering the first portion of the first window.

2. The method of claim 1, wherein performing the one or more actions comprises:

obscuring the second portion of the second window that is covering the first portion of the first window to form an obscured portion; and sharing the obscured portion of the second window and contents of a third portion of the first window that is not covered by the second window with the one or more participant devices.

3. The method of claim 1, wherein performing the one or more actions comprises:

identifying previously displayed contents of the first window that were displayed in the first portion of the first window prior to the second portion of the second window covering the first portion of the first window;

replacing contents of the second portion of the second window with the previously displayed contents of the first window; and sharing contents of a third portion of the first window that is not covered by the second window and the previously displayed contents of the first window with the one or more participant devices.

4. The method of claim 1, wherein performing the one or more actions comprises:

discontinuing sharing the contents of the first window while the second window is overlapping the first window.

5. The method of claim 1, wherein detecting the one or more windows further comprises:

receiving, from an application of the user device, an indication of states and locations of the one or more windows; and detecting the one or more windows based on the states and locations of the one or more windows.

6. The method of claim 5, wherein receiving the selection of the first window includes receiving, from the application of the user device, the selection of the first window.

7. The method of claim 1, wherein sharing the contents of the first window comprises:

determining coordinates of an area that bounds the first window;

cropping an image of overall content being displayed on the display of the conference endpoint to include content inside the area that bounds the first window and to exclude content outside the area that bounds the first window; and sharing the content inside the area that bounds the first window with the one or more participant devices.

8. The method of claim 1, wherein receiving the selection of the first window includes receiving, on an interface of the conference endpoint, a selection of an indicator associated with the first window.

9. A conference endpoint comprising:

a memory;

a network interface configured to enable network communications; and a processor, wherein the processor is configured to perform operations comprising:

receiving a request to share content with one or more participant devices, wherein the content is generated by a user device and displayed on a display of the conference endpoint, wherein the user device is connected to the conference endpoint and the conference endpoint is participating in a communication session with the one or more participant devices;

detecting one or more windows generated by the user device and displayed on the display of the conference endpoint;

receiving a selection of a first window of the one or more windows to share;

sharing contents of the first window with the one or more participant devices;

detecting that a second window is overlapping the first window on the display of the conference endpoint such that a first portion of the first window is covered by a second portion of the second window; and performing one or more actions with respect to the second portion of the second window that is covering the first portion of the first window.

10. The conference endpoint of claim 9, wherein the processor is configured to perform the operation of performing the one or more actions by:

obscuring the second portion of the second window that is covering the first portion of the first window to form an obscured portion; and sharing the obscured portion of the second window and contents of a third portion of the first window that is not covered by the second window with the one or more participant devices.

11. The conference endpoint of claim 9, wherein the processor is configured to perform the operation of performing the one or more actions by:

identifying previously displayed contents of the first window that were displayed in the first portion of the first window prior to the second portion of the second window covering the first portion of the first window;

replacing contents of the second portion of the second window with the previously displayed contents of the first window; and sharing contents of a third portion of the first window that is not covered by the second window and the previously displayed contents of the first window with the one or more participant devices.

12. The conference endpoint of claim 9, wherein the processor is configured to perform the operation of performing the one or more actions by:

discontinuing sharing the contents of the first window while the second window is overlapping the first window.

13. The conference endpoint of claim 9, wherein the processor is configured to perform the operation of detecting the one or more windows by:

receiving, from an application of the user device, an indication of states and locations of the one or more windows; and detecting the one or more windows based on the states and locations of the one or more windows.

14. The conference endpoint of claim 13, wherein the processor is configured to perform the operation of receiving the selection of the first window by:

receiving, from the application of the user device, the selection of the first window.

15. The conference endpoint of claim 9, wherein the processor is configured to perform the operation of sharing the contents of the first window by:

determining coordinates of an area that bounds the first window;

cropping an image of overall content being displayed on the display of the conference endpoint to include content inside the area that bounds the first window and to exclude content outside the area that bounds the first window; and sharing the content inside the area that bounds the first window with the one or more participant devices.

16. One or more non-transitory computer-readable storage media encoded with instructions that, when executed by a processor of a conference endpoint, cause the processor to execute a method comprising:

receiving a request to share content with one or more participant devices, wherein the content is generated by a user device and displayed on a display of the conference endpoint, wherein the user device is connected to the conference endpoint associated with the processor, and wherein the conference endpoint is participating in a communication session with the one or more participant devices;

detecting one or more windows generated by the user device and displayed on the display of the conference endpoint;

receiving a selection of a first window of the one or more windows to share;

sharing contents of the first window with the one or more participant devices;

detecting that a second window is overlapping the first window on the display of the conference endpoint such that a first portion of the first window is covered by a second portion of the second window; and performing one or more actions with respect to the second portion of the second window that is covering the first portion of the first window.

17. The one or more non-transitory computer-readable storage media of claim 16, wherein performing the one or more actions includes:

obscuring the second portion of the second window that is covering the first portion of the first window to form an obscured portion; and sharing the obscured portion of the second window and contents of a third portion of the first window that is not covered by the second window with the one or more participant devices.

18. The one or more non-transitory computer-readable storage media of claim 16, wherein performing the one or more actions includes:

identifying previously displayed contents of the first window that were displayed in the first portion of the first window prior to the second portion of the second window covering the first portion of the first window;

replacing contents of the second portion of the second window with the previously displayed contents of the first window; and sharing contents of a third portion of the first window that is not covered by the second window and the previously displayed contents of the first window with the one or more participant devices.

19. The one or more non-transitory computer-readable storage media of claim 16, wherein performing the one or more actions includes:

discontinuing sharing the contents of the first window while the second window is overlapping the first window.

20. The one or more non-transitory computer-readable storage media of claim 16, wherein detecting the one or more windows includes:

receiving, from an application of the user device, an indication of states and locations of the one or more windows; and detecting the one or more windows based on the states and locations of the one or more windows.

* * * * *